United States Patent Office 3,369,482
Patented Feb. 20, 1968

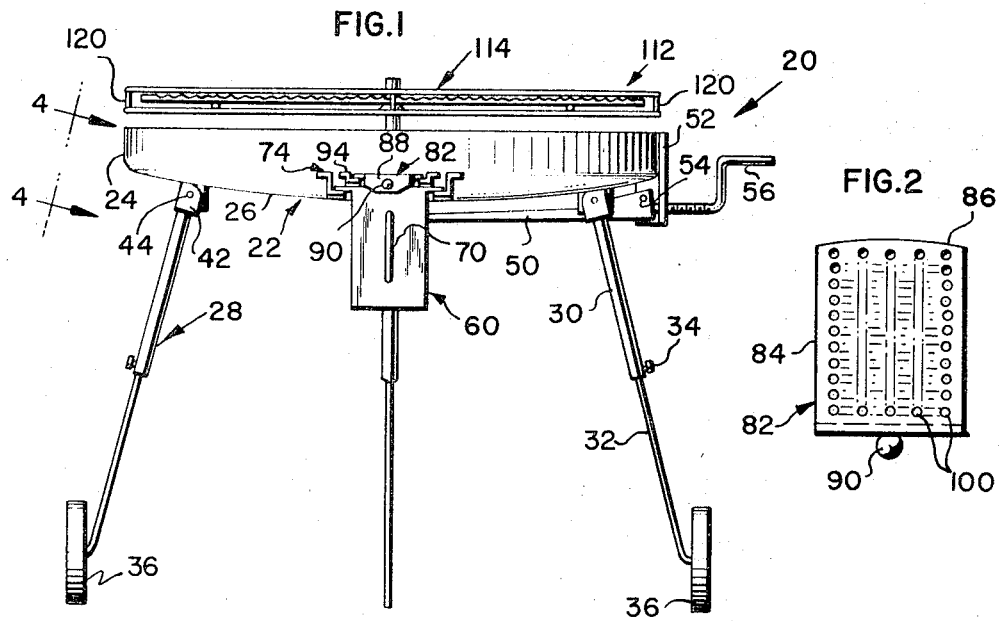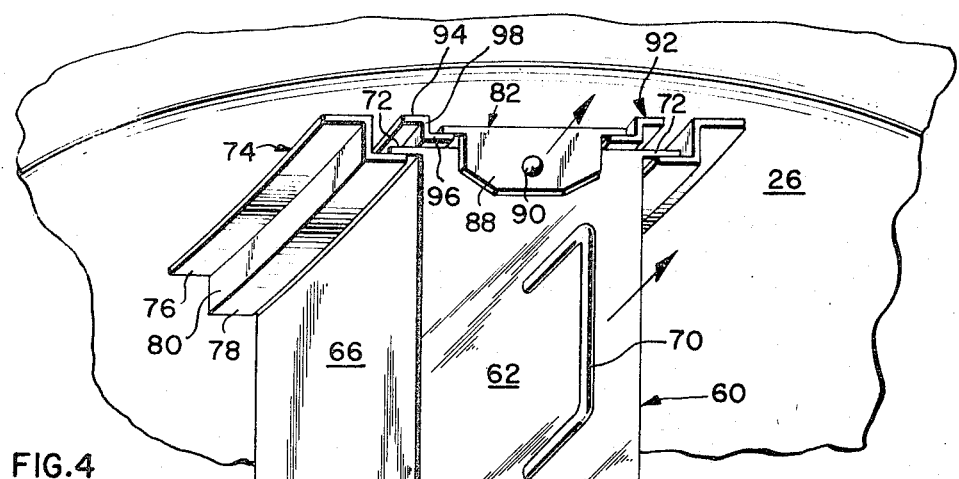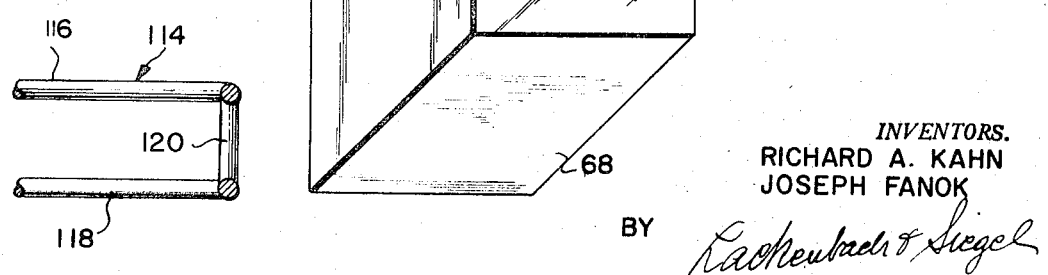

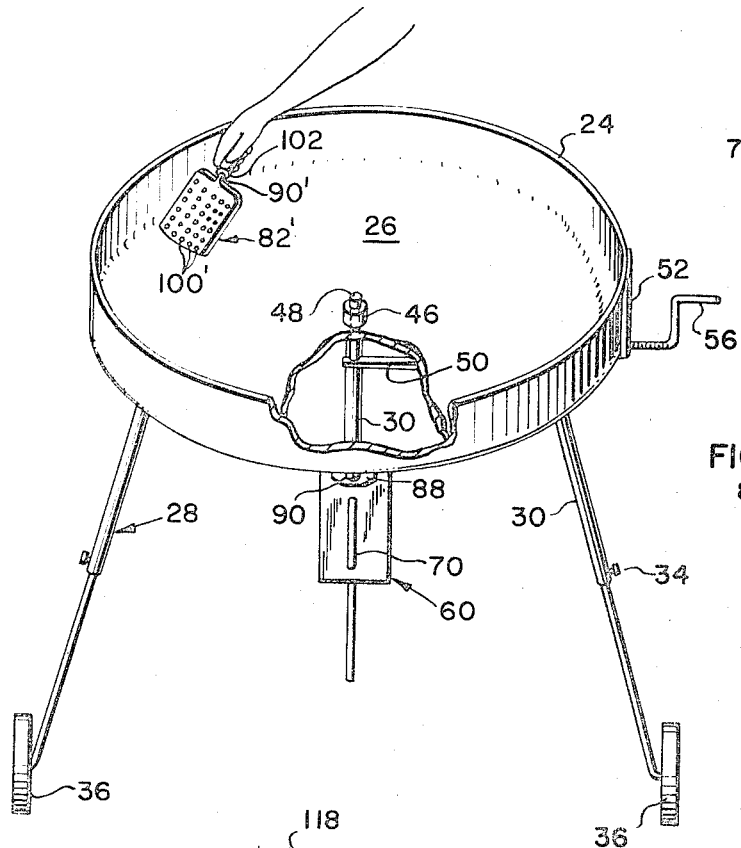
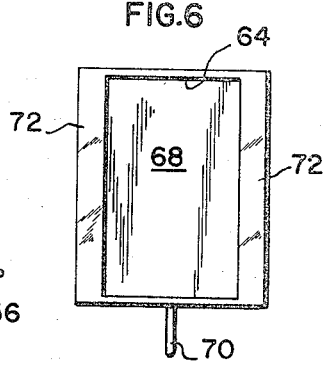
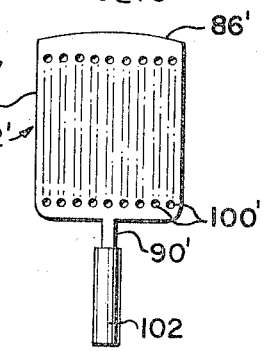
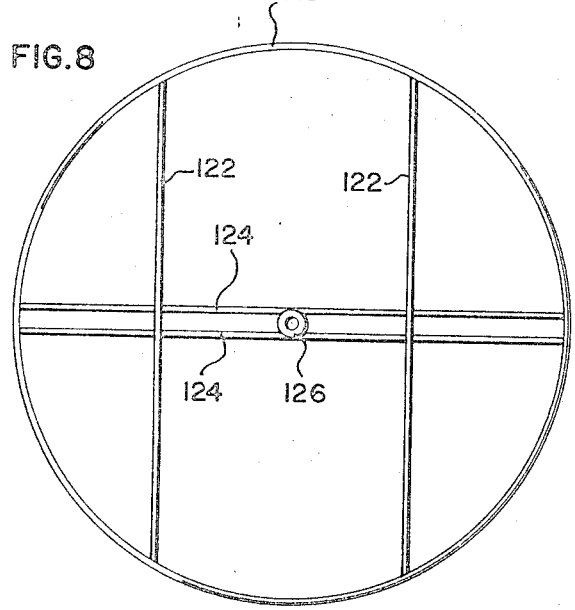
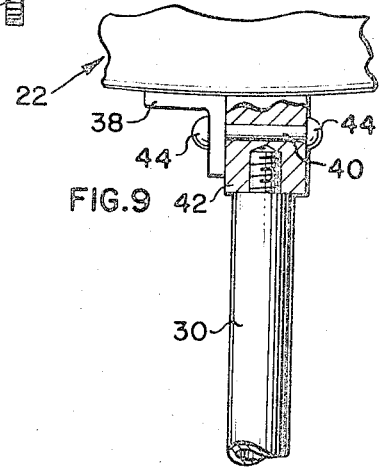
INVENTORS.
RICHARD A. KAHN
JOSEPH FANOK
ATTORNEYS

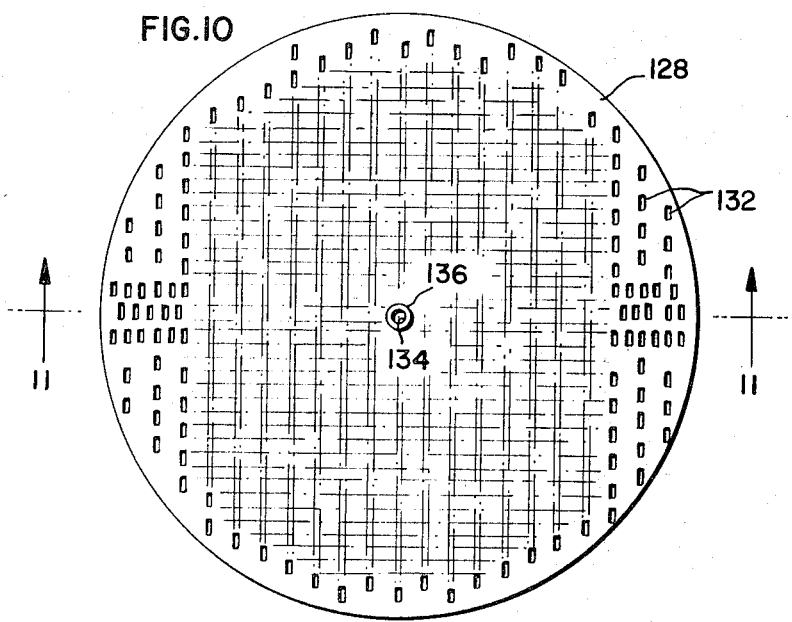
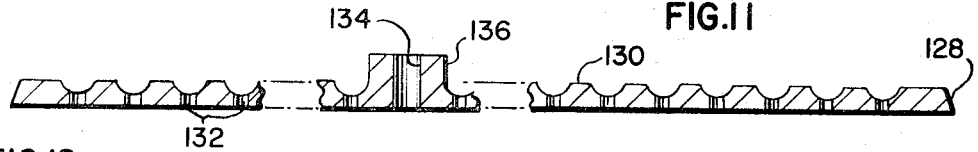
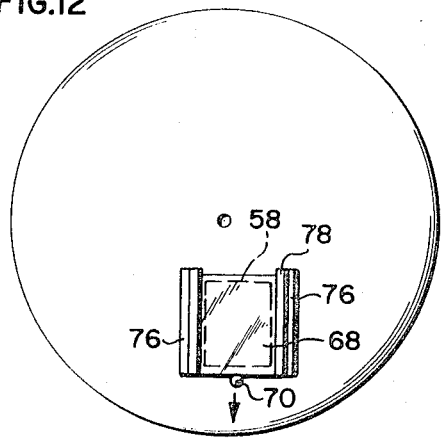
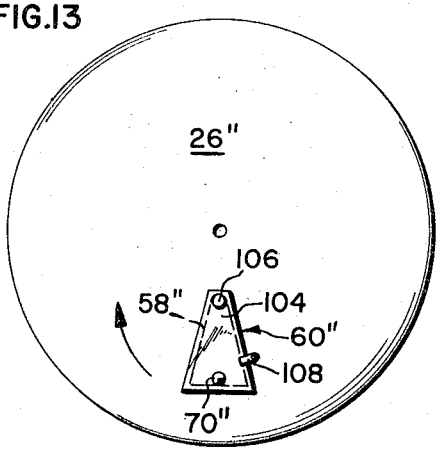
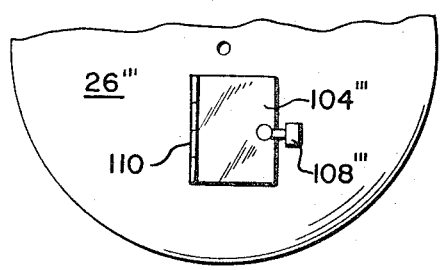
INVENTORS.
RICHARD A. KAHN
JOSEPH FANOK

3,369,482
PORTABLE APPARATUS FOR PREPARING
EDIBLE PRODUCTS
Richard A. Kahn, 123—60 83rd Ave., Kew Gardens,
N.Y. 11415, and Joseph Fanok, 32 Butterfly Drive,
Hauppauge, N.Y. 11787
Filed Nov. 12, 1965, Ser. No. 507,412
8 Claims. (Cl. 99—450)

ABSTRACT OF THE DISCLOSURE

Portable cooking apparatus for use with a solid fuel such as charcoal or the like comprising a bowl provided with an aperture in the bottom thereof, a first set of channels secured relative to the under side of the bowl, a closure slidably supported by the channels beneath the aperture to enable the aperture to be selectively opened and closed, a second set of channels secured relative to the under side of the bowl and an ash container slidably supported by the second set of channels beneath the aperture to enable ashes to be easily emptied from the bowl.

Statement of the problem

There is presently commercially available a relative plethora of portable barbeque grilles of many different types. The use and operation of an apparatus or device of this type is considered readily apparent to those skilled in the art. Basically, the user purchases a bag of briquettes, coals or the like, positions a desired quantity thereof in the bowl of the grille, and utilizes an aid, such as liquid fuel, to start the fire. When the coals reach a state commonly known as "white hot," a grate is either adjustably or non-adjustably positioned relative to the bowl, and the edible products positioned thereupon. After the edible products have been prepared, removed and consumed, the briquettes, coals or the like are allowed to cool.

A very significant and inherent problem is presented by the many different types of barbeque grilles that are presently commercially available. When the briquettes or coals have cooled, it is necessary to dispose of them. At this point, the bowl of the grille is usually filled with ashes, as well as what remains of the briquettes or coals originally positioned therein. Generally it is necessary to lift the grille in toto, carry it to a location in which the ashes and briquettes can be discarded, turn the grille over, and so dispose the ashes and coals. This is not only time consuming, but can be difficult as well since a certain amount of residual heat may still be subsisting. Since the bowl of the grille is usually fabricated of metal, which is a conductor of heat, handling the grille may be somewhat difficult. Even if the residual heat has dissipated, the grille itself is cumbersome to handle, enabling the user to dispose of the ashes and used briquettes in this manner.

Another inherent and very significant problem concerns the grate upon which the edible products are positioned while they are being prepared. It is well known that barbeque grilles are utilized to prepare such foodstuffs as meat. During the preparation thereof, the fats and grease will be deposited upon the various rods, braces, struts, and the like of the grate. This matter solidifies to some extent between uses of the grille, so that cleaning the grate thereof just prior to each subsequent use is an extremely time consuming, difficult, and distasteful job.

Objects of the invention

Having in mind the foregoing, it will be understood that a primary object of the present invention is to provide portable apparatus for preparing edible products that is constructed and arranged to enable the user to safely and conveniently remove, empty and discard the ashes and used hot charcoal briquettes, coal or the like from the bowl of the apparatus with facility subsequent to each use of the apparatus.

Another primary object of this invention, in addition to each of the foregoing objects, is to provide a portable apparatus for preparing edible products that is constructed and arranged to facilitate removing, emptying and discarding the ashes and used hot charcoal briquettes, coals or the like from the bowl of the apparatus without necessitating that the latter be translated to a location for this purpose, lifted, or in any other way handled.

Yet another primary object of the present invention, in addition to each of the foregoing objects, is to provide portable apparatus for preparing edible products comprising a bowl having an opening therein, and a spatula, door or cover for controlling the passage of the ashes and used charcoal briquettes, coals, or the like, through the opening or aperture. In one embodiment of this invention, the bowl of the portable apparatus is provided with a removable pan or container slidably operatively associated therewith, and the spatula, door or cover is constructed and arranged to conform with the contour, and configuration, of the bowl, thus enabling the user to direct the ashes and used briquettes or coals towards the opening or aperture with facility.

A further primary object of this invention is to provide portable apparatus for preparing edible products, said apparatus being constructed and arranged to substantially if not completely eliminate the problem of having to expend substantial time and effort in cleaning the grate of the apparatus just prior to each subsequent use thereof.

A still further primary object of the present invention, in addition to each of the foregoing objects, is to provide portable apparatus for preparing edible products, said apparatus being constructed and arranged to present a disposable grate upon which the edible products to be prepared are adapted to be positioned, enabling the user to discard the disposable grate subsequent to the use thereof, further enabling the elimination of grates upon which greases and fats collect and solidify between uses of the apparatus, still further eliminating the necessity for expending great amounts of time and effort in cleaning and scraping the grates clean and free of the solidified fats and greases.

The invention resides in the combination, construction, arrangement and disposition of the various component parts or elements incorporated in an improved portable apparatus for preparing edible products constructed in accordance herewith. The present invention will best be understood, and objects and important features other than those specifically enumerated above will become apparent when consideration is given to the following detailed description which, when taken in conjunction with the annexed drawing, describes, discloses, shows and illustrates preferred embodiments of the present invention and what is presently considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Description

In the drawings:

FIG. 1 is an elevational view of a portable apparatus for preparing edible products constructed in accordance with the principles of the present invention;

FIG. 2 is a plan view of an exemplary form of a cover, closure or control member for use with the apparatus illustrated in FIG. 1;

3,369,482

FIG. 3 is a partial bottom isometric view of the apparatus shown in FIG. 1;

FIG. 4 is an elevational view, partially in section, taken along the line 4—4 of FIG. 1;

FIG. 5 is a top isometric view, partially broken away, of the apparatus shown in FIG. 1, illustrating the manner in which the exemplary form of the cover, closure or control member shown in FIG. 2 is adapted to be utilized;

FIG. 6 is a top plan view of the pan or container particularly adapted for use with the apparatus shown in FIGS. 1 and 5;

FIG. 7 is a view similar to FIG. 2, but illustrating another exemplary form of the cover, closure, or control member illustrated therein;

FIG. 8 is a plan view of supporting frame particularly adapted for use with the apparatus shown in FIGS. 1 and 5;

FIG. 9 is a detail view, partially in section, illustrating the manner in which one of the legs of the apparatus shown in FIGS. 1 and 5 are operatively associated with the bowl thereof;

FIG. 10 is a top plan view of a disposable cooking portion or pan particularly adapted for use with the apparatus shown in FIGS. 1 and 5;

FIG. 11 is a cross-sectional view taken along the line 11—11 of FIG. 10;

FIG. 12 is a bottom plan view of the apparatus shown in FIGS. 1 and 5, illustrating a modification thereof;

FIG. 13 is a view similar to FIG. 12, illustrating another modification of the apparatus shown in FIGS. 1 and 5; and FIG. 14 is a view similar to FIGS. 12 and 13, illustrating therein a further modification.

With reference now to the drawings, and particularly to FIG. 1 thereof, portable apparatus for preparing edible products constructed in accordance with the principles of the present invention, and generally designated by the reference character 20, is illustrated therein. The apparatus 20, which may be denoted as a portable barbeque grille, comprises a bowl 22 having an upstanding cylindrical side wall 24, and a tapered or sloping bottom wall 26 which is of generally curvilinear configuration.

The portable barbeque grille 20 comprises, further, a plurality of supporting legs generally designated by the reference character 28. Each of the legs comprise an upper portion 30 and a lower portion 32 that are telescopingly operatively associated with one another. Suitable detent assemblies 34 are provided for maintaining the portions 30 and 32 in a desired adjusted position relative to one another. A plurality of the legs 28 comprise wheels 36 enabling the barbeque grille 20 to be translated between various locations. The upper portions 30 of the legs 28 are preferably pivotally operatively associated with the bowl 22, and to this end, the latter is provided with a mounting bracket 38 (FIG. 9) of L-shaped configuration. A pivot pin 40 is adapted to extend through the vertical leg of this bracket, and through a mounting block 42 which is adapted to be threadably connected to the upper portion 30 of the legs 28. The pivot pins 40 are maintained in relation to the bracket 38 and the mounting block 42 through the medium of any suitable fastener, such as the rivets 44.

The bowl 22 comprises a bushing 46 (FIG. 5) that is centrally disposed with respect thereto, and extends generally vertically upwardly therefrom. An adjusting member 48 is adapted to be disposed within the bushing 46, and to reciprocate vertically with respect thereto. A lever 50 is adapted to engage the lower end of the adjusting member 48, and to cause the latter to move vertically with respect to the bushing 46. The lever 50 is pivotally connected to a bracket 52 (FIG. 1) through the medium of a pivot pin 54. The bracket 52 is affixed to the bowl 22, and extends downwardly therefrom. A manually operable crank 56 is adapted to threadably engage the bracket 52, and to engage the lever 50. As the crank is manually rotated in a clockwise direction (looking generally towards the left in FIG. 1), the crank will advance towards the lever 50, causing it to pivot and move the adjusting member 48 generally vertically upwardly relative to the bowl 22 and the bushing 46. When the crank 56 is manually rotated in an opposite direction, the adjusting member 48 will be lowered.

The bowl 22 comprises an opening or aperture 58 in the bottom wall 26 thereof, as clearly illustrated in phantom in FIG. 12. Subsequent to the use of the portable barbeque grille 20, in the usual manner, ashes and used charcoal briquettes, coals or the like, which may still be capable of eminating a substantial degree of thermal energy, will be disposed in the bowl 22. It is of course desirable that the ashes and used charcoal briquettes be discarded. To this end, a removable pan or container, generally designated by the reference character 60 (FIG. 3) is adapted to be removably operatively associated wtih the bottom wall 26 of the bowl 22 at the aperture or opening 58. The pan or container 60 may be fabricated of any suitable material, and comprises a front wall 62, a rear wall 64 (FIG. 6), a plurality of side walls 66, and a bottom wall 68. Though the pan or container 60 is illustrated as being of generally rectangular configuration, it is of course within the scope of the present invention to vary the contour or configuration of this component part as desired. A handle 70 which may be fabricated of the same or a different material than the pan or container, is fixedly positioned upon the front wall 62 thereof. The pan or container 60 comprises a plurality of ledges 72 extending laterally outwardly from the side walls 66 thereof. The ledges 72 are particularly adapted to be disposed in sliding engagement with a corresponding one of a plurality of channels 74 of Z-shaped configuration. The channels 74 comprise an upper leg 76 adapted to be affixed to the bottom wall 26 of the bowl 22 in any suitable manner. The channels further comprise a lower leg 78 upon which the ledges 72 are adapted to be disposed. The upper and lower legs 76 and 78, respectively, are separated by a vertically extending leg 80, thus spacing the lower leg 78 and the ledges 72 from the bottom wall 26 of the bowl. In this manner, sliding movement of the pan or container 60 relative to bowl 22 will be facilitated. The channel 74 may be fabricated of any suitable material, and may be constructed of a material that is the same or different from the material from which the pan or container 60 is fabricated.

With particular reference now to FIGS. 2 and 3, there is illustrated therein a cover, closure or control member generally designated by the reference character 82 for controlling the passage through the opening or aperture 58 of the ashes or charcoal briquettes, coals or the like, or both, disposed within the bowl 22. The control member 82 comprises a spatula or shovel portion 84 having an edge 86 of curvalinear configuration. The degree of curvature of the edge 86 is of the utmost significance, and preferably is contoured to conform with the curvature of the bottom wall 26 of the bowl 22. A handle portion 88 extends from the spatula or shovel portion 84, upon which a knob 90 or other handle-like member is adapted to be positioned.

As particularly illustrated in FIG. 3, the cover, closure or control member 82 is adapted to be slidably operatively associated with the bottom wall 26 of the bowl 22 to close and open the aperture 58. Thus, the importance of the spacing between the bottom wall 26 and the lower leg 78 of the channel 74. Within this space or spacing, a second plurality of channels generally designated by the reference character 92 are particularly adapted to be disposed. The channels 92 are of similar configuration as the channels 74, and comprise an upper leg 94 adapted to be affixed to the bottom wall 26 in any suitable manner, and a lower leg 96 upon which the spatula portion 84 of the control member 82 is adapted to be disposed. As is now considered readily apparent, the control member 82 is adapted to be slidably movable relative to the bottom wall 26, and to facilitate this movement, the lower legs 96 of the channels 92 are spaced therefrom. To this end, the channels 92, like the channels 74, comprise a vertical leg 98 extending between the upper legs 94 and the lower legs 96.

The use and operation of a portable barbeque grille constructed in accordance with the principles of the present is considered readily apparent in view of the foregoing description thereof. The grille is utilized in a conventional manner to prepare the foodstuffs and edible products. Subsequent to the use thereof, it is desirable that the ashes and used charcoal briquettes, coals or the like, be discarded. The control member 82 is grasped at the knob 90 and slidably moved relative to the bottom wall 26 of the bowl 22 to provide communication between the interior of the bowl and the pan or container 60. At this point, the control member 82 may be used in the fashion of a spatula or shovel, since the edge 86 is contoured to conform with the contour, shape and configuration of the bottom wall. As clearly illustrated in FIG. 5, the control member 82 may thus be used to direct the ashes and used charcoal briquettes, coals, or the like towards the aperture 58. The material to be discarded will thus fall into the pan or container 60. When all of the material to be discarded has been removed from the bowl 22, the pan or container 60 is grasped at the handle 68 and removed from its position relative to the bowl 22, as clearly illustrated in FIG. 3. The pan or container may then be carried to any suitable location at which the material to be discarded may be disposed of. It will now be understood that at no time will it be necessary to move or translate the grille or apparatus 20 from the location at which it is used to prepare the foodstuffs or edible products to a location at which the material to be discarded can be disposed of. Nor will it be necessary at any time to lift or otherwise be encumbered by the grille or apparatus 20 in disposing of the ashes and used briquettes.

During the use of the portable barbeque grille or apparatus 20, it may be desirable to provide for airflow over, upon and about the briquettes, coals or the like disposed within the bowl, in order to induce the transfer of thermal energy therebetween. In this manner, the time required for the briquettes, coal or the like to reach a state in which they are "white hot" will be reduced. To this end, the control member 82 (FIG. 2) may be provided with a substantial number of apertures or openings. In addition, the openings or apertures 100 will tend to dissipate the heat relative to the spatula or shovel portion 84. This will be particularly advantageous if the control member is fabricated of metal. In this instance, the knob 90 or other handle-like member will be fabricated of a material that is a non-conductor of heat.

With particular reference now to FIG. 7, wherein like reference characters indicate like parts, but wherein the reference characters are primed, there is illustrated therein a modification of the control member 82 shown in FIG. 2. Again, the edge 86' is contoured, configured and arranged to conform with the contour, shape and configuration of the bottom wall 26 of the bowl 22. In this modification, the handle-like member 90' comprises a sleeve 102 fixedly positioned thereupon. The handle-like member 90' may be fabricated of the same material as the spatula portion 84', which may be metal, and thus preferably the sleeve 102 is fabricated of a material that is a non-conductor of heat, such as wood.

With particular reference now to FIGS. 13 and 14, wherein reference characters again indicate like parts, but wherein the reference characters are primed twice and thrice over, respectively, there are illustrated therein modifications of the pan or container 60, which may now be denoted as a means or assembly for enabling the ashes and used charcoal briquettes, coals, or the like to be discarded and disposed of without requiring that the grille or apparatus 20 be translated between locations, or otherwise moved, lifted, or the like. In FIG. 13, the opening or aperture 58" in the bottom wall 26" is of generally trapezoidal configuration. The means or assembly 60" comprises a door 104 that is pivotally operatively associated with the bottom wall 26" in any suitable manner, as through the medium of a pivot pin 106. The door 104 comprises a latch 108 of any suitable construction adapted to cooperate with the bottom wall 26" and retain the door in a position in which it covers or encloses the aperture 58". In this particular embodiment, the control member 82 or 82' is not utilized. Accordingly, the door or cover 104 may be provided with apertures or openings (not shown) similar to the apertures or openings 100 or 100'. It is of course desirable that, in this modification, as well as in the other modifications disclosed herein, that the ashes or briquettes be precluded from falling out of the bowl until they are to be discarded. Accordingly, the openings or apertures provided in the control member 82 or 82', or in the door or cover 104 will be of small diameter.

In FIG. 14, the door or cover 104''' is pivotally operatively associated with the bottom wall 26''' of the bowl in any suitable manner, as through the medium of a hinge assembly 110. The hinge assembly may be of any suitable construction, and for example, may be a piano-type hinge. A latch assembly 108''' is provided to retain the door or cover 104''' in the position relative to the bowl illustrated in FIG. 14. Once again, a control member, such as the members 82 or 82', is not utilized. The door or cover 104''' may therefore be provided with openings or apertures (not shown) for the purposes hereinbefore described and set forth.

With particular reference now to FIGS. 1, 4, 8, 10 and 11, it will be seen that a portable barbeque grille or apparatus 20 constructed in accordance with the principles of the present invention comprises, still further, a cooking grate, generally designated by the reference character 112, upon which the edible products or foodstuffs to be prepared are adapted to be disposed. It is well known that while the edible products and foodstuffs are being prepared, greases and fats are deposited upon the cooking grate. These fats and greases generally are not removed subsequent to the use of the grille, if for no other reason than it is an undesirable chore to perform. As a result, during the interim between utilizations of the grille, the fats and greases tend to solidify on the grate. If the user wishes to remove the solidified fats and greases from the cooking grate before each subsequent use, this chore is even more difficult to perform. Some even prefer to again utilize the cooking grate without removing the solidified fats and greases, relying upon the very substantial degree of thermal energy eminating from the hot charcoal briquettes, coals, or the like, to sterilize the grate.

As hereinbefore pointed out, it is a primary object of the present invention to provide a portable barbeque grille or apparatus for preparing foodstuffs or edible products that substantially, if not completely, eliminates the chore of cleaning the cooking grate, either subsequent to a prior use, or prior to a subsequent use, as well as eliminating the very distasteful appearance of a grille having a cooking grate upon which greases and fats have solidified.

Accordingly, the cooking grate 112 comprises a supporting frame generally designated by the reference character 114 (FIGS. 1 and 4) that is defined by an upper annular or circular bar 116, and a lower annular or circular bar 118. The bars 116 and 118 are adapted to be disposed in spaced relationship with respect to one another, and to this end a plurality of vertical struts 120 extend therebetween and are affixed thereto. As particularly illustrated in FIG. 8, a plurality of chordal braces 122 are affixed to the lower annular bar 118 to provide support and stability to the supporting frame 114. An other plurality and stability to the supporting frame 114. Another plurality of braces 124 is provided which are affixed to the lower bar 118 and extend diametrically thereacross in a substantially adjacent relationship with respect to one another. The braces 124 provide a support for a bushing 126 which is disposed therebetween and affixed thereto.

With particular reference to FIGS. 10 and 11, it will be seen that the cooking grate 112 comprises, further, a disposable cooking portion or pan 128. The pan 128 may be fabricated of any suitable material, and preferably is fabricated of a material rendering this component part extremely economical of fabrication. Such a material might be aluminum. The pan 128 is constructed and arranged to provide a substantial number of ribs 130 along one surface thereof to reduce the surface area of contact between this element and the foodstuffs or edible products to be prepared. A very substantial number of apertures 132 extends through the pan 128 to provide a more than sufficient degree of airflow therethrough. A central aperture 134 extends through the center of a bushing 136 which is disposed in the center of the pan 128. The bushing 136 is adapted to be aligned with the bushing 126 of the supporting frame 114.

In the use and operation of the present invention, the supporting frame 112 is adapted to be disposed upon the adjusting member 48, which may now be denoted as a vertically adjustable spindle. Though not shown, the spindle 48 will be provided with a collar located above the bushing 46 in the bowl 22 upon which the supporting frame 112 will rest. The spindle 48 will thus be capable of raising and lowering or adjusting the supporting frame 112 relative to the bowl 22, thus enabling the user to vary the degree of thermal energy that reaches the edible products or foodstuffs positioned upon the disposable pan 128. The pan will also be disposed upon the spindle 48, with the bushing 132 thereof resting upon the bushing 126 of the supporting frame 112. After the foodstuffs or edible products have been prepared and consumed, the pan 128 may simply be removed from the supporting frame and discarded. The substantial number of apertures or openings 130 will facilitate heat dissipation to enable handling of the pan 128 without any attended discomfort shortly after completing preparation of the edible products or foodstuffs.

It will be understood at this point that the supporting frame 112 is retained. The disposable pan 128 may be made available to the public in packages of three, six, nine, or a dozen, or any other suitable manner. Their fabrication inexpensively may be further facilitated by eliminating the bushing 132, and simply crimping the pan 128 about the aperture 130. The pan need not be fabricated or constructed to provide the ribs 130 to further decrease the cost of fabrication, though the ribs are desirable to maintain the surface area of contact between the pan and the foodstuffs at a value that will substantially, if not completely, eliminate the problem of sticking therebetween.

The present invention contemplates within the scope thereof fabricating the removable pan or container 60 of annular or circular configuration as opposed to the generally rectangular configuration illustrated in the drawings. In this instance, the channels 74 for supporting the removable pan or container will be of semi-annular or semi-circular configuration. One such channel may be all that is required when the pan or container 60 is fabricated of annular or circular configuration. In addition, the present invention contemplates within the scope and ambit thereof fabricating the removable pan or container 60 in such a manner and of such a material as to enable the pan to be disposed after a single use, or after only a few uses. Of course, the manner in which the pan or container is constructed, and the material from which it is fabricated, in this instance, should be such as to maintain the cost of manufacture and replacement at an absolute minimum. Thus, such a disposable pan or container might also be of annular or circular configuration. The material might of tinfoil or aluminum. To further maintain the cost of manufacture and replacement at an absolute minimum, the channel or channels 74 may be eliminated, and the disposable removable pan or container mounted upon the bowl 22 in any suitable manner, such as through the medium of conventional hooks. Such a hook or hooks might be the conventional cup-hooks found in the home connected to the bowl 22 in any suitable manner, such as through the medium of spot-welding. The disposable and removable pan or container would be fabricated with suitable reinforced apertures adapted to cooperate with the hooks. The disposable and removable pan or container may also be fabricated in the form of an insulated bag comprising a plurality of layers, the inside of which is fabricated of tinfoil or extremely flexible aluminum, and the outside of which is fabricated of a heavy gauge paper. It is to be understood, therefore, that the embodiment or embodiments illustrated in the drawings are intended by way of example only, and not in any way intended to be limiting.

While the invention has been shown, illustrated, described and disclosed in terms of embodiments or modifications that it has assumed in practice, the scope of the invention should not be deemed limited by the precise embodiments or modifications herein shown, illustrated, described or disclosed, such other embodiments or modifications intended to be reserved especially as they fall within the scope of the claims here appended.

What is claimed is:

1. Portable apparatus for preparing foodstuffs or edible products to be consumed comprising, in combination, a bowl having a bottom wall in which charcoal briquettes, coals, or the like capable of emanating a substantial degree of thermal energy are particularly adapted to be disposed; and means enabling a user to discard the ashes and used briquettes, coals, or the like without necessitating that the apparatus be translated between locations, lifted, or caused to be moved in any other manner; said means comprising a pan or container slidably removable relative to an undersurface of said bowl; a plurality of channels affixed to said undersurface; said channels being of substantially Z-shaped configuration to define lower legs spaced from said undersurface; said pan or container having ledges adapted to rest upon said lower legs, enabling said pan or container to be slidably moved relative to said undersurface; said bowl comprising an aperture providing communication with the interior of said pan or container; a second set of channels affixed to said undersurface within the space defined between that surface and said lower legs; said second plurality of channels having lower legs; and a closure means adapted to be positioned upon the lower legs of said second plurality of channels for slidable movement relative thereto, enabling the aperture in the bowl to be closed and opened through the medium of sliding said closure means relative to the undersurface of said bowl upon the lower legs of said second plurality of channels.

2. Apparatus as defined in claim 1, wherein the bottom wall of said bowl is of curvilinear configuration, and wherein said closure means comprises an edge, the contour and configuration of which corresponds with the contour, shape and configuration of said bottom wall, enabling said closure means to be utilized as a spatula or shovel to direct the ashes and used charcoal briquettes, coals, or the like wherein the bowl to be directed towards the aperture therein and into the pan or container.

3. Apparatus as defined in claim 1, wherein said closure means comprises a substantial number of apertures; and a handle-like member fabricated of a material that is non-heat conducting.

4. Apparatus as defined in claim 1 wherein there is further provided a disposable cooking grate comprising a supporting frame; and a disposable pan removably positionable within said supporting frame.

5. Apparatus as defined in claim 4, wherein said disposable pan comprises a substantial plurality of ribs to reduce the surface area of contact between the pan and the foodstuffs or edible products adapted to be disposed thereupon.

6. Apparatus as defined in claim 4, wherein said disposable pan comprises a substantial plurality of apertures to facilitate airflow.

7. Apparatus as defined in claim 4, wherein said supporting frame comprises a plurality of annular bars disposed in spaced relationship with respect to one another; and at least one plurality of stabilizing braces having a bushing disposed therebetween and affixed thereto upon which said disposable pan is particularly adapted to rest.

8. Apparatus as defined in claim 1, wherein the assembly for enabling a user to discard the ashes and used charcoal briquettes, coals, or the like is constructed and arranged to be disposable.

References Cited

UNITED STATES PATENTS

| | | | |
|---|---|---|---|
| 2,120,683 | 6/1938 | Simmons | 126—25 |
| 2,237,081 | 4/1941 | Owens | 126—25 |
| 2,677,364 | 5/1954 | Turner. | |
| 3,082,757 | 3/1963 | Hohe | 126—25 |
| 3,126,881 | 3/1964 | Blotsky | 126—25 |
| 3,209,743 | 10/1965 | Stewart et al. | 126—25 |

FOREIGN PATENTS

| | | |
|---|---|---|
| 659,147 | 3/1963 | Canada. |
| 677,362 | 1/1964 | Canada. |

WALTER A. SCHEEL, *Primary Examiner.*

J. M. NEARY, *Assistant Examiner.*